US009100490B2

(12) United States Patent
Redman et al.

(10) Patent No.: US 9,100,490 B2
(45) Date of Patent: Aug. 4, 2015

(54) SYSTEM AND METHOD FOR ADJUSTING HANDS-FREE PHONE

(75) Inventors: Brian Redman, Richmond (CA); Reza Ahmadian-Yazdi, Richmond (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 2207 days.

(21) Appl. No.: 11/496,443

(22) Filed: Aug. 1, 2006

(65) Prior Publication Data

US 2007/0165834 A1     Jul. 19, 2007

Related U.S. Application Data

(60) Provisional application No. 60/755,082, filed on Jan. 3, 2006.

(51) Int. Cl.
*H04M 1/60*     (2006.01)

(52) U.S. Cl.
CPC ............ *H04M 1/6041* (2013.01); *H04M 1/605* (2013.01)

(58) Field of Classification Search
CPC ........................... H04M 1/6041; H04M 1/605
USPC ............... 381/56–59, 74, 309, 102, 104, 109, 381/122; 455/232.1, 194.2, 355; 379/390.01, 388.02, 388.05, 395
See application file for complete search history.

(56) References Cited

U.S. PATENT DOCUMENTS

| | | | |
|---|---|---|---|
| 5,212,722 A | 5/1993 | Murata | 379/58 |
| 5,313,661 A | 5/1994 | Malmi et al. | 455/232.1 |
| 5,589,818 A | 12/1996 | Queen | |
| 5,732,390 A | 3/1998 | Katayanagi et al. | 704/227 |
| 5,796,818 A | 8/1998 | McClennon et al. | 379/390 |
| 5,912,965 A | 6/1999 | Boyer | 379/390 |
| 5,970,137 A | 10/1999 | Le Damany et al. | 379/388 |
| 6,195,572 B1 | 2/2001 | Patterson et al. | 455/570 |
| 6,504,926 B1 | 1/2003 | Edelson et al. | 379/390.01 |
| 6,795,547 B1 | 9/2004 | Bjarnason | 379/390.03 |
| 6,959,176 B1 * | 10/2005 | Krueger | 455/234.1 |

(Continued)

FOREIGN PATENT DOCUMENTS

| | | |
|---|---|---|
| DE | 42 00 089 | 7/1992 |
| DE | 197 42 797 | 4/1999 |
| DE | 101 46 664 | 2/2003 |
| WO | WO 00/60833 | 10/2000 |

OTHER PUBLICATIONS

Machine translation of DE 19742797, Apr. 1999, 2 pages.*

(Continued)

*Primary Examiner* — Ping Lee
(74) *Attorney, Agent, or Firm* — Steptoe & Johnson LLP

(57) ABSTRACT

A communications device having a user configurable speakerphone feature is provided. A user may be provided with a plurality of selectable settings for configuring the operation of a microphone or the processing of speech. For example, a user may select settings to filter ambient noise for a cleaner sound or increase a microphone's sensitivity in a conference call environment. In one embodiment, the user may select a setting that changes a microphone level or microphone operating range. When the microphone detects speech, the speech may be processed in accordance with user selected processing settings. For example, a user may select settings to specify a gain control, a frequency response, or an activity threshold. Thus, a user may configure a speakerphone to improve sound quality on the receiving end.

9 Claims, 3 Drawing Sheets

(56) References Cited

U.S. PATENT DOCUMENTS

2002/0086653 A1* 7/2002 Kim ............................. 455/307
2002/0150262 A1* 10/2002 Carter ........................... 381/86
2005/0094822 A1* 5/2005 Swartz .......................... 381/56

OTHER PUBLICATIONS

PTO Translation of DE19742797C1, 1999, 14 pages.*
German Office Action & English Translation thereof, Jul. 9, 2007.

* cited by examiner

SYSTEM AND METHOD FOR ADJUSTING HANDS-FREE PHONE

This application claims the benefit of U.S. Provisional Application No. 60/755,082, filed Jan. 3, 2006, which is herein incorporated by reference in its entirety.

FIELD OF THE INVENTION

The invention relates generally to telephone systems, and in particular, to a telephone system with hands-free or speakerphone capabilities.

BACKGROUND OF THE INVENTION

Most telephone sets equipped with microphones and speakers for use in a hands-free mode, such as a speaker phone, have preset factory settings for defining an operating range of a microphone ("MIC"). An engineering design team tries to anticipate all types of user conditions when establishing factory presets. Thus, the presets are a compromise of settings to allow the phones to work adequately under most conditions.

Factors that effect the detection of a signal at the receive end, such as signal to noise ratio (SNR), background noise (BGN) and echo, vary depending on the operating range of the microphone with respect to a user. To save processor overhead, several preset levels are fixed in engineering design, with levels of factors such as SNR, BGN and echo predetermined for varying conditions, ranging from a close range setting to a far range setting. For example, in a close range setting, a user is assumed to be near a microphone and background noise level is set as "low." In contrast, in a far range setting, a user is assumed to be far from a microphone and a background noise level is set as "high."

Adjustments among the several preset levels ranging from close to far range typically occur automatically and out of the user's control. Accordingly, the actual performance may be less than optimal. For example, if a processor selects a close range setting, sensitivity of the pickup is defined in the preset as "low" and a user must be close to the microphone for reasonable sound levels at the receiving end. Such an automatic setting may limit the usefulness for large group participation. On the other hand if the sensitivity is defined as "high," the microphone may pick up environmental noise, such as a radio or TV in the background, which will be difficult to filter out without compromising the transmitted signal.

In a conventional system, a user may alter the final transmission gain stage by adjusting the transmission (speaker) volume control. However, the user cannot set a sensitivity and selectivity of the receive (MIC) circuit.

Thus, what is desired is a system for allowing a user to have some degree of control over the operating range for the MIC by setting the sensitivity and selectivity of the MIC circuit and thus control the ambience which will be perceived by the listener at the other end of the call.

BRIEF SUMMARY OF THE INVENTION

The invention allows a user to set a sensitivity and selectivity of a MIC circuit manually in a telephone system with hands-free or speakerphone capability. In one embodiment, the user may select a preset level from among a plurality of preset levels displayed on an onscreen menu. By determining the sensitivity and selectivity of the MIC circuit, a user may control the ambience at the transmit end of the system.

In one embodiment of the invention, the telephone system may be a handheld telephone, such as a cordless or cellular phone, that includes a microphone and a speakerphone feature. The speakerphone feature may include software that, when executed, allows a user to select a setting for a microphone operating range from a plurality of selections. The speakerphone feature may also include software that, when executed, sets the microphone operating range, e.g., near or far, according to the setting. Further, the speakerphone feature may include software that, when executed, detects whether speech occurs in a microphone operating range selected by a user. When speech is detected, it may be processed for gain control in accordance with the selection of the microphone operating range selection (e.g., filtering of background noise for a near setting).

Another embodiment of the invention relates to a method for providing a setting to a handheld telephone with a microphone and a speakerphone feature. A user may be provided with a plurality of settings for an operating range of a microphone. The settings may include at least two settings for a range close to and a range far from the microphone. The method may also include receiving a selection for the operating range of the microphone from the user. Finally, the selection may be applied to processing circuitry for the microphone.

DETAILED DESCRIPTION OF THE INVENTION

The invention allows a user to set a sensitivity and selectivity of the MIC circuit using an onscreen menu. In particular, the invention provides a user with software to manually select between preset levels determining the sensitivity and selectivity of the MIC circuit, which controls the ambience at the transmit end of the system. In addition, the invention allows a user to override preset levels.

Figure 1:
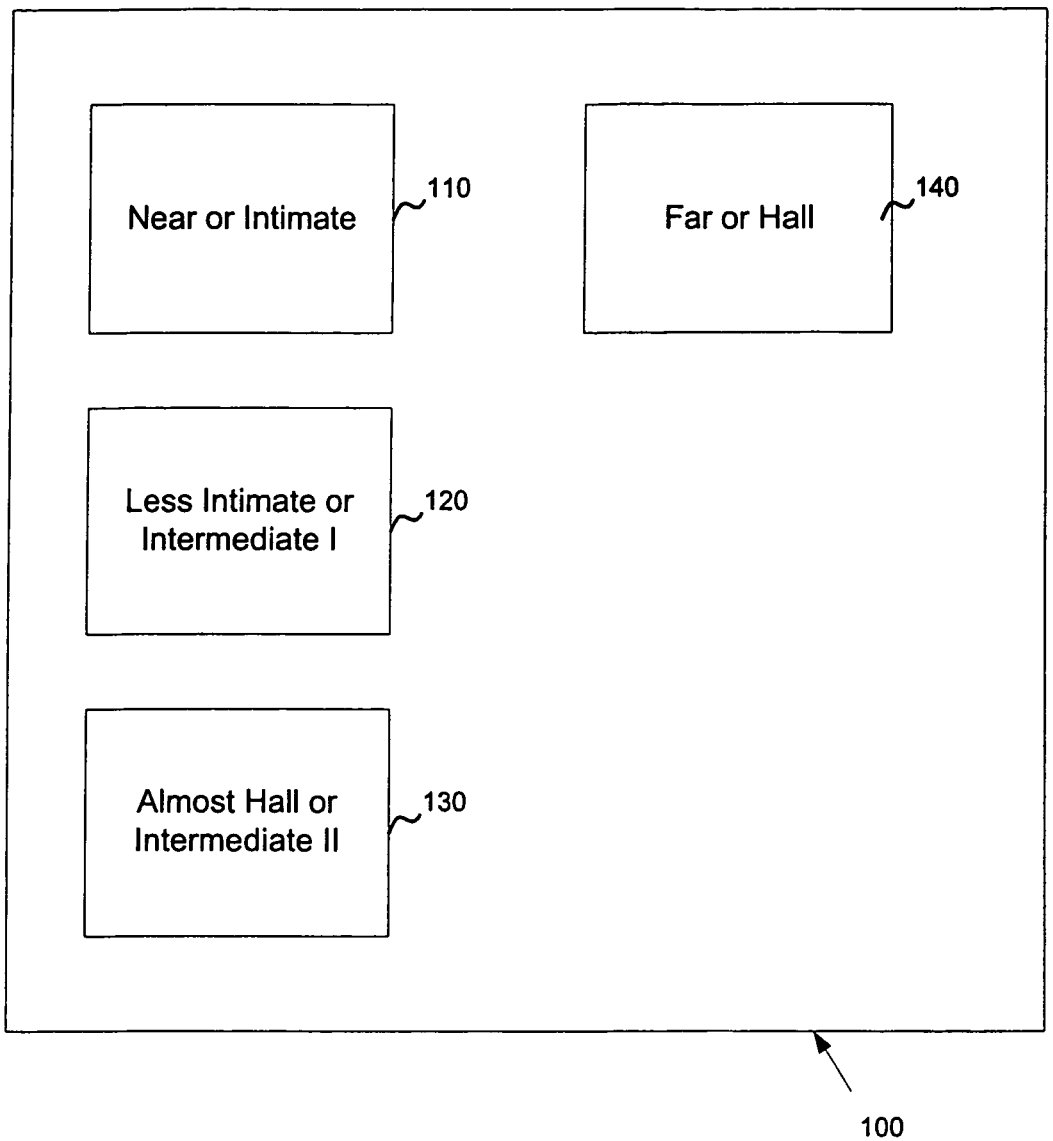
FIG. 1 is an exemplary onscreen menu in accordance with one embodiment of the invention.

FIG. 1 is an exemplary onscreen menu in accordance with one embodiment of the invention. Onscreen menu 100 may include a near or intimate setting 110, a less intimate or intermediate I setting 120, an almost hall or intermediate II setting 130 and a far or hall setting 140. A user may select from among the settings 110-140 to define the area that speech will be detected. For example, near or intimate setting 110 may filter noise from beyond an immediate vicinity or zone of a microphone on a telephone with a hands-free or speakerphone capability and provide little pickup level. This setting may deliver sound comparable to a conventional handset. This setting may be of particular use in a noisy environment, where a user may desire to filter out background noise.

At the opposite end of the spectrum, far or hall setting 140 may enable group discussions with suitable clarity. Far setting 140 may increase the area in which speech is detected and increase the pickup level. Other factors may be modified according to the selected range. For example, a frequency response may be changed to provide improved sound quality depending on the selected setting.

Intermediate settings 120 and 130 may provide a range of settings between the near 110 and far 140 settings, respectively. However, one skilled in the art will recognize that any number of intermediate settings may be provided in accordance with the invention. In one embodiment of the invention, the settings provided on onscreen menu 100 correspond to the preset levels or MIC pickup levels provided by the MIC control circuitry of the telephone equipped with hands-free or speakerphone capability.

In addition to, or instead of, predefined settings corresponding to the pickup levels provided by the MIC control circuitry, programmable settings could be provided to override the predefined settings at the MIC control circuitry. For example, a dropdown menu may be provided to a user having settings from a MIC control circuitry, as well as settings for various conditions not specified by the MIC control circuitry. These additional settings may be selected from a menu or programmed by a user at a user interface. Moreover, the settings may define the gain, frequency response, and activity thresholds for various conditions. The additional settings are applied in the same way as the preset MIC pickup levels described above.

Figure 2:
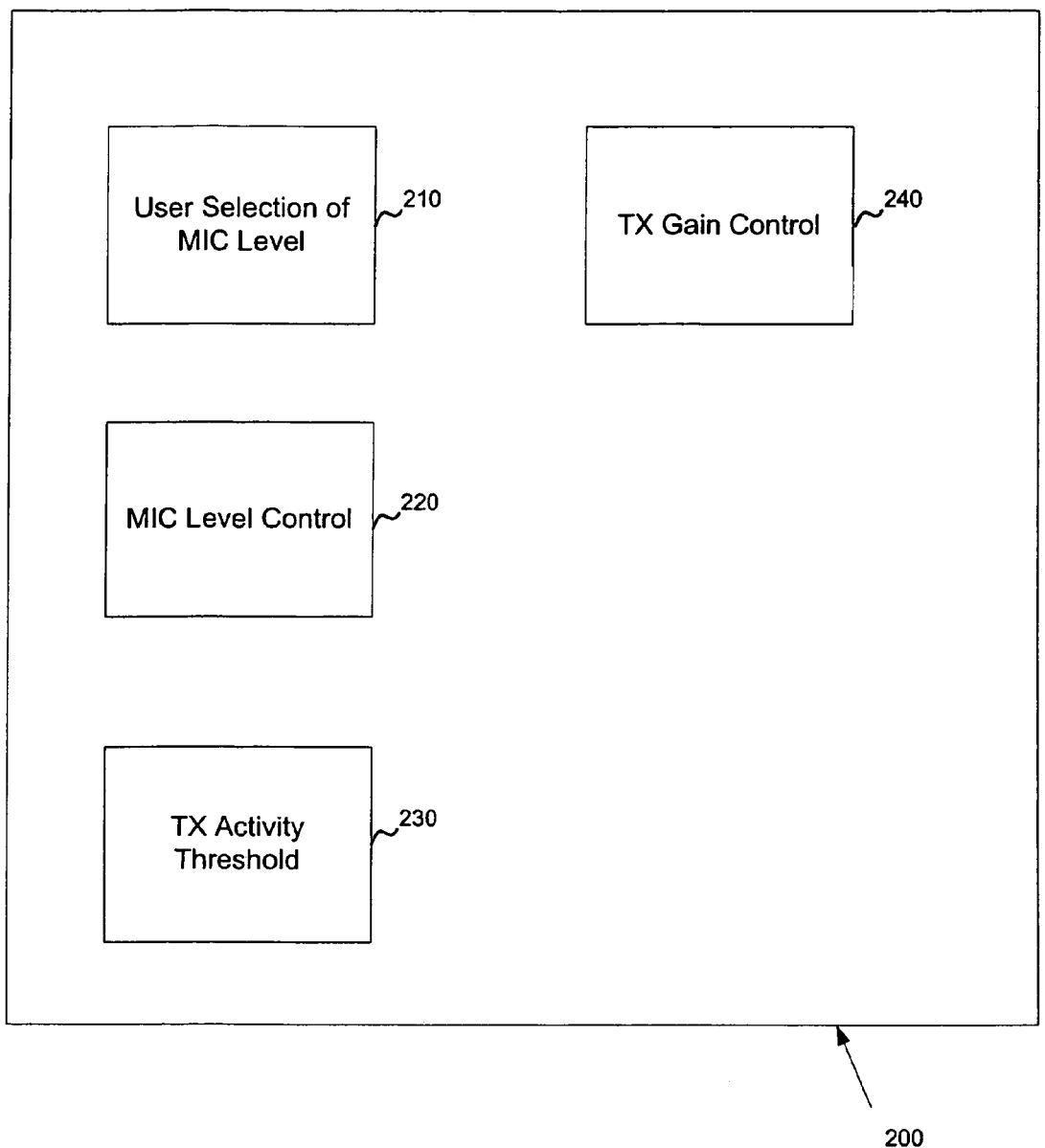
FIG. 2 is an exemplary processor in accordance with one embodiment of the invention.

FIG. 2 is an exemplary processor in accordance with one embodiment of the invention. Processor 200 may include software modules 210-240 for performing various transmission operations. Those skilled in the art will recognize that processor 200 may also contain software for performing receive operations and other operations that are not depicted herein. Further, although processor 200 is depicted as a single processor, one skilled in the art will appreciate that multiple processors may be used without departing from the scope or spirit of the invention. In another embodiment, software modules 210-240 may be provided on different processors, levels, or layers without departing from the scope of the invention. The inventive feature of providing the user with access to controls and expanding the breadth of controls available may be provided by software modules 210-240 located in various locations in different embodiments.

User selection of MIC level 210 ("user selection 210") may include software that, when executed, allows a user to set a particular MIC level at MIC level control 220. MIC level control 220 may include preset MIC pickup levels provided in a telephone system with hands-free or speakerphone capability. In conventional telephone systems, MIC pickup levels are automatically selected by a digital signal processor. The selected MIC pickup level is then used by a transmission activity threshold 230 and a transmission gain control 240 for signal detection and gain control, respectively. However, the invention differs from conventional telephone systems by allowing a user to select a desired MIC level with user selection 210.

Figure 3:
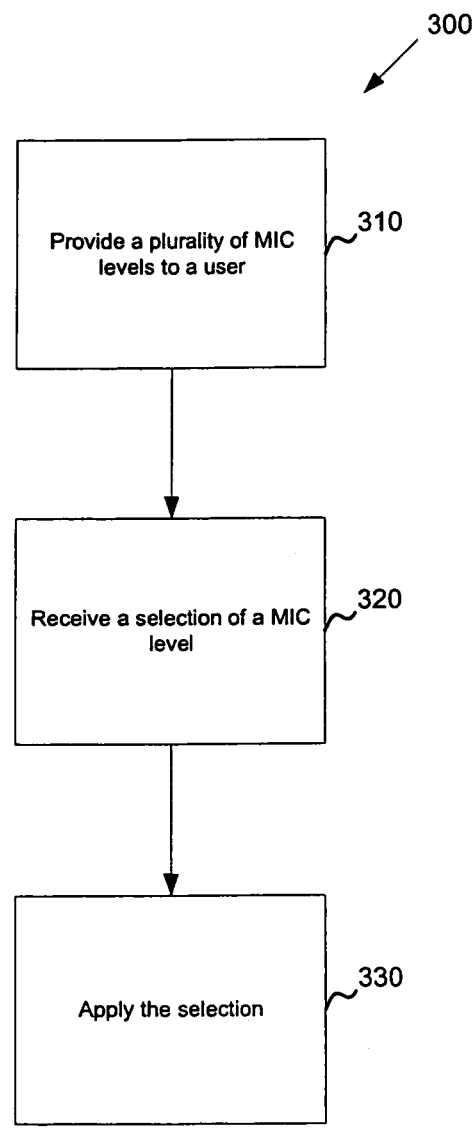
FIG. 3 is a method for providing user selection of a MIC pickup level in accordance with one embodiment of the invention.

FIG. 3 is a method of providing user selection of a MIC pickup level in accordance with one embodiment of the invention. In one embodiment 300, user selection 210 may provide a plurality of MIC levels to a user (step 310). In particular, user selection 210 provides a plurality of predefined or preset MIC levels at MIC level 220 and may present these levels as menu options to a user. However, in another embodiment, user selection 210 may provide additional sets of MIC levels, allowing a user to override the preset MIC levels provided at MIC level 220. For example, user selection 210 may expand a menu selection of MIC levels with selections that respond to various conditions not accounted for at MIC level 220. These additional selections may define gain, frequency response, and activity threshold levels. Although one embodiment provides the additional selections in a menu form, in another embodiment, user selection 210 may provide a user with a user interface for entering values for gain, frequency response, and/or activity threshold levels. These additional menu selections define various conditions that are not preset or predefined by MIC level 220. For example, user selection 210 may access sets of data for these other various conditions at a location other than the location of software for MIC level 220.

User selection 210 then receives a MIC pickup level selection from a user in step 320. As described above, the MIC pick-up level may include a preset MIC pick-up level from MIC level 220 or a user-defined MIC pick-up level. User selection 210 may store the MIC pickup level selection, or user-defined setting, and apply the selection to MIC level 220 in step 330. In this manner, user selection 210 may override the automatic selection of a MIC pickup level by MIC level 220. By allowing a user to select or define a MIC pickup level with user selection 210, the invention allows a user to define an area where speech is detected by processor 200.

For example, after applying a particular MIC pickup level at MIC level 220, transmission activity threshold 230 may determine whether there is speech in the area selected by the user. If the user selects a close or near range 110, transmission activity threshold 230 may detect only speech in a close proximity to the phone. Thus, transmission activity threshold 230 determines whether the level of speech detected matches the level required for a particular setting.

If transmission activity threshold 230 detects an active line, such as a detected level matching a threshold required for a particular setting, then transmission gain control 240 may operate to amplify or attenuate a signal to a required level. For a far or hall setting 140, gain control 240 may detect a low level signal far from the microphone and amplify it. In contrast, for a close or near setting 110, gain control 240 may detect speech in close proximity to the microphone and filter out background noise. When a level of speech detected by transmission activity threshold 230 does not meet or exceed the threshold set for a particular MIC setting, then the line is not considered active and no transmission gain control processing is performed by the transmission gain control software 240. By allowing a user to select an operating range for a microphone, the invention allows a user to have some control over the ambience perceived by the listener at the other end of a call.

The foregoing disclosure of various embodiments of the invention has been presented for purposes of illustration and description. It is not intended to be exhaustive or to limit the invention to the precise forms disclosed. Many variations and modifications of the embodiments described herein will be apparent to one skilled in the art in light of the above disclosure. The scope of the invention is to be defined only by the claims appended hereto; and by their equivalents. Further, in describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

What is claimed is:

1. A method for operating a communications device, the communications device having a speakerphone including a microphone, the method comprising:
   providing a user with a plurality of options for configuring the speakerphone feature, wherein the plurality of options include an intimate option, an intermediate option, and a hall option that each specify settings to adjust sensitivity of the microphone and settings to specify a frequency response of the microphone that control ambience at a transmit end of the communication device;
   receiving a user input that selects one of the plurality of options; and
   applying the settings, associated with an option selected by the user input, to the communications device, wherein said applying comprises:
   in response to the user input selecting the intimate option, applying intimate settings that configure the communication device to filter noise from beyond an immediate vicinity of the microphone,
   in response to the user input selecting the hall option, applying hall settings that configure the communication device to detect speech in a first area beyond the immediate vicinity of the microphone, and
   in response to the user input selecting the intermediate option, applying intermediate settings that configure the communication device to detect speech in a second area that extends beyond the immediate vicinity of the microphone but does not extend as far as the first area.

2. The method of claim 1, further comprising:
   detecting speech in accordance with operating range and microphone level settings associated with the option selected by the user input.

3. The method of claim 2, further comprising:
   processing the detected speech in accordance with gain control, frequency response, and activity threshold settings associated with the option selected by the user input.

4. A communications device having a configurable speakerphone feature including a microphone, the communications device comprising:
   a user interface for providing a user with a plurality of options for configuring the speakerphone feature, wherein the plurality of options includes an intimate option, an intermediate option, and a hall option that each specify settings to adjust the sensitivity of the microphone and settings to specify a frequency response of the microphone;
   an input means for receiving a user input that selects one of the plurality of options; and
   at least one processor adapted to apply settings to the communications device associated with the option selected by the user input, wherein
   the intimate option is associated with intimate settings that configure the communication device to filter noise from beyond an immediate vicinity of the microphone,
   the hall option is associated with hall settings that configure the communication device to detect speech in a first area beyond the immediate vicinity of the microphone, and
   the intermediate option is associated with intermediate settings that configure the communication device to detect speech in a second area that extends beyond the immediate vicinity of the microphone but not extend as far as the first area.

5. The communications device of claim 4, further comprising:
   a speech detection means for detecting speech in accordance with operating range and microphone level settings associated with the option selected by the user input.

6. The communications device of claim 5, further comprising:
   at least one processing means for processing the detected speech in accordance with gain control, frequency response, and an activity threshold settings associated with the option selected by the user input.

7. A communications device comprising:
   a microphone;
   a microphone circuit that controls the operation of the microphone; and
   a user interface that allows a user to select options for the operation of the microphone that are provided to the microphone circuit, said options specifying settings to adjust the sensitivity of the microphone and settings to specify a frequency response of the microphone, wherein
   said settings control ambience at a transmit end of the communications device,
   said options include an intimate option, and intermediate option, and a hall option,
   said intimate option is associated with intimate settings that configure the communication device to filter noise from beyond an immediate vicinity of the microphone,
   said hall option is associated with the hall settings that configure the communication device to detect speech in a first area beyond the immediate vicinity of the microphone, and
   said intermediate option is associated with intermediate settings that configure the communication device to detect speech in a second area that extends beyond the immediate vicinity of the microphone, but does not extend as far as the first area.

8. The communications device of claim 7, wherein the microphone circuit includes a microprocessor that includes software modules for responding to the options selected by the user.

9. The communications device of claim 7, wherein said settings associated with the intimate option, intermediate option, and hall option further include an activity threshold.

* * * * *